Patented Dec. 24, 1940

2,225,894

UNITED STATES PATENT OFFICE 2,225,894

SUGAR COMPOSITION

John R. White, Belmont, and Joseph Avery Dunn, Newtonville, Mass., assignors to Lever Brothers Company, a corporation of Maine No Drawing. Application June 16, 1938,
Serial No. 214,054

12 Claims. (Cl. 99—92)

This invention relates to sugar compositions to be used in the manufacture of confections, pastry, and other foodstuffs and particularly for sugaring and dusting doughnuts and the like.

Ordinary powdered sugar is somewhat hygroscopic and when subjected to damp or humid conditions forms lumps and loses its free-flowing characteristics. Likewise, if such powdered sugar is brought into contact with grease or fat, it absorbs these materials, forming a gummy mass having an unpleasant yellow color. Ordinary powdered sugar, therefore, is unsatisfactory for dusting grease-containing pastry materials, such as, for example, doughnuts, for the reason that such pastries contain moisture which dissolves the sugar and grease which stains it.

Many different materials have been added to sugar to reduce its hygroscopicity and to maintain it in a free-flowing condition. For example, sugar mixtures have been prepared heretofore which contain such salts as tricalcium phosphate or magnesium carbonate and inert materials such as starch. These mixtures are free-flowing under humid conditions. However, they are not resistant to staining by grease or fat; in fact, tricalcium phosphate and magnesium carbonate cause such mixtures to absorb and to be stained by grease more readily than ordinary powdered sugars.

It has also been suggested that high melting point fats, such as, for example, hydrogenated cocoanut oil having a melting point above 110° F., can be mixed with powdered sugar to render the sugar non-staining and grease-resisting. These sugar-fat mixtures form dusting powders of good quality, but still leave something to be desired in their grease-resisting and non-staining properties.

An object of the present invention, therefore, is to provide free-flowing sugar compositions which have improved grease-resisting and non-staining properties.

Another object of the invention is to provide sugar compositions which contain, in addition to the sugar, suitable proportions of a shortening containing fats, hydrogenated oils, unhydrogenated oils or mixtures of the same, and salts which are capable of protecting the sugar against lumping and from becoming stained by grease or fat.

Another object of the invention is to provide an improved method of making free-flowing sugar compositions which are non-staining and grease-resisting.

A further object of the invention is to provide a sugar composition which does not acquire undesirable flavors or odors.

Typical compositions embodying the invention contain finely divided sugar, such as powdered sugar, an edible efflorescent salt such as for example, tricalcium phosphate and/or magnesium carbonate and a shortening, such as an edible fat or a mixture of fats and oils which is solid at room temperature.

The preferred process of making the sugar compositions consists generally of heating the sugar to a temperature above the melting point of the shortening, mixing the heated sugar with the shortening until an intimate mixture of the materials is obtained and thereafter cooling the mixture slowly with continued agitation. The edible efflorescent salt may be added to the sugar either before or after the shortening has been mixed with the sugar. The resulting product consists of a mixture of finely divided and separate particles of the sugar which are coated with a thin film of the fat or mixture of fat and oil which forms a moisture- and stain-resisting coating on the particles and a salt which aids in maintaining the compositions free-flowing. The order in which the ingredients are mixed varies the characteristics of the resulting product. For example, when the efflorescent salt is added after the shortening has been applied to the sugar, a very free-flowing composition is produced. When, however, the salt is mixed with the sugar prior to addition of the shortening, a more spongy composition is produced probably for the reason that the particles of salt are coated with the shortening. This latter composition is particularly useful for forming a thick coating on confections and pastries. The former composition finds particular utility in forming thin coatings on such foodstuffs, for the reason that only that portion of the composition is retained which is in direct contact with the foodstuff. The remainder of the composition falls off because it is very free-flowing.

As set forth above, the use of high melting point fats with sugar improves the anti-staining properties of the sugar composition, while the presence of tricalcium phosphate or magnesium carbonate alone, or in the presence of an inert material such as starch, has been found to reduce the grease resistance and anti-staining properties of the sugar. We have found, however, that by using an edible efflorescent salt or a salt such as tricalcium phosphate or magnesium carbonate which is capable of maintaining the sugar in free-flowing condition, with fat or a stabilized mixture of fat and hydrogenated or unhydrogenated oils, and powdered sugar, a free-flowing sugar composition is produced which has stain-resisting properties superior to those of the sugar and fat mixtures. Moreover, fats or mixtures of fats and oils which are not classified as high melting point fats may be used to produce products of excellent quality. For example, shortenings comprising mixtures of edible, partially hydrogenated oils, such as for example, peanut, cottonseed, or cocoanut oil with a hard fat, such as stearin, which have melting points of about 75° F. or above, may be used with the sugar. Likewise, shortenings comprising mixtures of edible unhydrogenated oils and a hard fat which have melting points of about 75° F. or higher are entirely satisfactory for use with the sugar. These shortenings preferably should be stabilized and deodorized so that they will not become rancid or separate into solid and liquid phases upon heating and cooling.

Sugar compositions according to this invention do not acquire off flavors, for example, the flavor of cooking fats, and of other food products. Ordinary sugar, flour, fats and other ingredients of foodstuff acquire the odors and tastes which are present in the atmosphere in which they are stored. While it is not definitely understood why our sugar compositions do not acquire such "off" flavors, it is believed that the tricalcium phosphate or magnesium carbonate absorbs the odors. It is known that the olfactory sense is far more sensitive than the sense of taste and it is believed to be probable that these salts are capable of absorbing the odors so completely that they cannot be smelled, while at the same time the odors are present in the salts in too small a concentration to be tasted.

A typical example of a method of preparing sugar compositions of the type embodying the invention is as follows: 100 parts of 6$x$ grade confectioner's sugar are sifted together with 3 parts of pulverized tricalcium phosphate of the edible grade. The sifted mixture is placed in a water jacketed kettle and heated to about 150° F. Five parts of a melted shortening consisting of a mixture of partially hydrogenated peanut, cottonseed or cocoanut oil and stearin having a final solidifying point of about 86° F. is gradually added to the mixture of salt and sugar while subjecting the entire batch to agitation. Mixing or agitation is continued until the fat is distributed uniformly throughout the sugar. During the mixing treatment the shortening, sugar, and salt are maintained at a temperature of about 150° F. by the heated water in the jacket of the kettle. When the shortening is distributed, the mixture is allowed to cool gradually while agitation is continued until a temperature of about 70-75° F. is reached, at which temperature the shortening will have solidified on the surface of the particles. The cooled mixture is then passed through a sieve to remove any lumps which may have formed during the mixing operation. The sugar is then ready for use.

Agitation of the shortening in a melted condition with the heated sugar distributes the shortening uniformly throughout the mixture and forms a thin, almost mono-molecular layer on the surface of the sugar particles which prevents the sugar from absorbing moisture from the air and which likewise prevents the cooking fat, such as is present on the surface of doughnuts, from penetrating into and staining the sugar particles. Separation of the oil from the fat is avoided by cooling slowly with agitation for the reason that the oil which is liquid at temperatures below the melting point of the fat is distributed over the particles and so intimately mixed with the fat that it cannot separate as a distinct and separate liquid film on the particles but rather is retained in a matrix of the solidified fat. The sugar composition has substantially the same appearance as ordinary confectioner's sugar and does not become lumpy or sticky even when stored in open containers in a very damp or humid atmosphere.

The sugar composition also may be produced by mixing the sugar and fat shortening until the shortening is distributed as a thin film on the individual sugar particles and thereafter mixing the tricalcium phosphate with the sugar. The resulting product is extremely free-flowing and has the advantage of being applicable in a very thin coating to pastries or confections for the reason that all of the sugar composition except that in direct contact with the pastry or confection will fall off and can be reused to dust other articles.

It has been found that when granulated sugar is ground to produce 4$x$ or 6$x$ grade powdered sugars, the frictional heat that is generated during the grinding action heats the powdered sugar to a satisfactory temperature for mixing with the shortening. The shortening should be mixed with the ground sugar immediately after removal of the latter from the grinder.

While the compositions produced in accordance with the processes set forth above would contain approximately 3% of edible efflorescent salt and approximately 5% of the shortening, it will be understood that the proportions of these ingredients can be varied depending upon the use to which the sugar composition is to be put. For example, as little as about 1% of the edible salt may be used while as much as 10% or even more can be used. The greatest percentage of the edible efflorescent salt to be used will be determined by the cost of the product and by the appearance or the taste of the salt in the product.

Likewise, the proportion of shortening will be determined by the cost of the product and by the desired characteristics of the final product. For example, 10% or slightly more of the shortening may be used while as little as 3% or even slightly less may be used depending largely upon the amount of grease on the article to be dusted with the sugar. Sugar compositions containing approximately 3% of tricalcium phosphate and 5% of shortening have been found to be entirely satisfactory in use and superior to any other type of doughnut sugar mixture heretofore produced. For example, comparative tests were made by sugaring freshly cooked doughnuts with ordinary confectioner's sugar, confectioner's sugar containing 3% tricalcium phosphate, confectioner's sugar which had been mixed with 5% shortening, and a sugar composition of the type described herein containing 3% tricalcium phosphate and about 5% of a normally solid shortening. The same weight of sugar or sugar composition was applied to each of the doughnuts and these doughnuts were observed at the end of one hour, 8 hours, and 24 hours. These tests showed that ordinary confectioner's sugar was superior in stain-resistance to confectioner's sugar containing tricalcium phosphate; that the confectioner's sugar and shortening composition was superior in stain-resistance to ordinary confectioner's sugar, and that the mixture containing 5% shortening and 3% tricalcium phosphate was superior to the mixture of high melting point fat and sugar, only, in all of the tests.

Likewise, comparative tests on a mixture of sugar and shortening having a solidifying temperature of about 125° F. and a composition containing sugar, 5% shortening having a solidifying temperature of about 125° F. and 3% tricalcium phosphate were made in which doughnuts were sugared with equal amounts of these compositions, packed in moisture-proof containers and allowed to stand at 70° F. and 90° F. The coatings on the doughnuts that were dusted or sugared with the mixture of shortening, sugar and tricalcium phosphate were discolored to a much lesser extent than the coatings on the doughnuts dusted with a mixture of sugar and shortening, only, thereby showing that products embodying the present invention have superior grease-resisting and anti-staining properties.

It will be understood from the foregoing description that we have produced a high quality of sugar composition which is highly suitable for use in pastry and confectionery making and that the composition has excellent moisture- and grease-resisting properties. It will be understood that there can be variations made in the proportions of the ingredients forming the novel sugar compositions within the limits set forth above without departing from the invention. Therefore, the process and product described herein should be considered as illustrative only and not as limiting the scope of the following claims.

We claim:

1. A free-flowing composition for dusting and sugaring food substances which is non-hygroscopic and resistant to staining by grease comprising a mixture of finely divided sugar, between about 1% and 10% of an edible salt capable of maintaining the sugar free-flowing and between about 3% and 10% of shortening which is solid at about 75° F. and is distributed as a thin film on the surfaces of the sugar particles.

2. A free-flowing composition for dusting and sugaring food substances which is non-hygroscopic and resistant to staining by grease comprising a mixture of finely divided sugar particles, about 3% of an edible salt capable of maintaining the sugar free flowing and about 5% of a normally solid mixture of edible fat and oil distributed as a surface film on the sugar particles.

3. A free-flowing composition for dusting and sugaring food substances which is non-hygroscopic and resistant to staining by grease comprising a mixture of finely divided sugar particles, about 3% of an edible salt capable of maintaining the sugar free-flowing and about 5% of a normally solid mixture of edible fat and at least partially hydrogenated vegetable oil distributed as a surface film on the sugar particles.

4. A free-flowing composition for dusting and sugaring food substances which is non-hygroscopic and resistant to staining by grease comprising a mixture of finely divided sugar particles, about 3% of an edible salt capable of maintaining the sugar free-flowing and about 5% of a normally solid mixture of edible fat and vegetable oil distributed as a surface film on the sugar particles.

5. A process of making a free-flowing sugar composition for dusting and sugaring food substances which is non-hygroscopic and resistant to staining with grease comprising heating finely divided sugar, adding to said sugar about 1% to 10% of shortening and about 3% to 10% of an edible salt capable of maintaining the sugar free-flowing while agitating to produce sugar particles having a thin surface coating of the shortening.

6. A process of making a free-flowing sugar composition for dusting and sugaring food substances which is non-hygroscopic and resistant to staining with grease, comprising heating and agitating finely divided sugar and about 1 to 10% of pulverized edible salt capable of maintaining the sugar free-flowing, adding to the heated mixture while agitating between about 3% and 10% of shortening, and slowly cooling the mixture while agitating to about normal temperature to form a thin surface film of the shortening on the sugar.

7. A process of making a free-flowing sugar composition for dusting and sugaring food substances which is non-hygroscopic and resistant to staining with grease, comprising heating and agitating finely divided sugar, adding to the heated sugar while agitating between about 3% and 10% of shortening, and slowly cooling the mixture while agitating to about normal temperature to form a thin surface film of the shortening on the sugar and adding to and mixing with the sugar about 1 to 10% of pulverized tricalcium phosphate.

8. A process of making a free-flowing sugar composition for dusting and sugaring food substances which is non-hygroscopic and resistant to staining with grease, comprising heating finely divided sugar, adding to the heated mixture while agitating about 5% of melted shortening having a solidifying temperature above 75° F. and about 3% of pulverized tricalcium phosphate to form a thin surface film of the shortening on the sugar.

9. A process of making a free-flowing sugar composition for dusting and sugaring food substances which is non-hygroscopic and resistant to staining by grease comprising agitating and heating to about 150° F. a mixture of finely divided sugar and about 3% of tricalcium phosphate, adding to the mixture while agitating about 5% of a melted shortening having a solidifying temperature in excess of 75° F. and less than 150° F., continuing the agitation until the shortening is distributed uniformly and cooling the mixture with agitation to about 70° F. to 75° F. to cause the shortening to solidify and form a thin surface film on the sugar.

10. A free-flowing composition for dusting and sugaring food substances which is non-hygroscopic, resistant to staining by grease and does not acquire undesirable flavors, comprising a mixture of finely divided sugar particles and about 1% to 10% of an edible salt capable of absorbing odors and maintaining the sugar free-flowing and about 3% to 10% of a normally solid shortening distributed as a thin surface film on the sugar particles.

11. A sugar composition having free-flowing, non-hygroscopic and grease-resisting properties comprising finely divided sugar particles in intimate mixture with about 1% to 10% of pulverized edible, efflorescent salt capable of maintaining the sugar free-flowing and about 3% to 10% of shortening that is solid at room temperature, said sugar particles being coated with said shortening.

12. A free-flowing sugar composition having non-hygroscopic and grease-resisting properties comprising a mixture of powdered sugar, about 1% to 10% of tricalcium phosphate and about 3% to 10% of a shortening that is solid at about 75° F., said sugar having a surface film of said shortening.

JOHN R. WHITE.
JOSEPH AVERY DUNN.